(12) United States Patent
Jia et al.

(10) Patent No.: US 11,252,757 B2
(45) Date of Patent: Feb. 15, 2022

(54) UPLINK LBT CHANNEL DETECTION METHOD, UPLINK DATA SENDING METHOD, AND DEVICE

(71) Applicant: HUAWEI TECHNOLOGIES CO., LTD., Guangdong (CN)

(72) Inventors: Qiong Jia, Shanghai (CN); Zhengzheng Xiang, Shanghai (CN); Jun Luo, Shanghai (CN); Weiwei Fan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 341 days.

(21) Appl. No.: 16/294,895

(22) Filed: Mar. 6, 2019

(65) Prior Publication Data
US 2019/0208544 A1    Jul. 4, 2019

Related U.S. Application Data

(63) Continuation of application No. PCT/CN2017/095293, filed on Jul. 31, 2017.

(30) Foreign Application Priority Data

Sep. 8, 2016    (CN) .......................... 201610811901.8

(51) Int. Cl.
*H04W 74/08*    (2009.01)
*H04W 72/14*    (2009.01)
*H04W 72/10*    (2009.01)
*H04W 16/14*    (2009.01)

(52) U.S. Cl.
CPC ....... *H04W 74/0808* (2013.01); *H04W 72/10* (2013.01); *H04W 72/14* (2013.01); *H04W 74/08* (2013.01); *H04W 16/14* (2013.01)

(58) Field of Classification Search
None
See application file for complete search history.

(56) References Cited

U.S. PATENT DOCUMENTS

2015/0271847 A1    9/2015    Luo et al.
2017/0280475 A1*   9/2017    Yerramalli ........ H04W 28/0278
(Continued)

FOREIGN PATENT DOCUMENTS

CN    104994591 A    10/2015
CN    105636233 A    6/2016

OTHER PUBLICATIONS

Qualcomm Incorporated, R1-166362, Self-contained subframe timeline analysis, 3GPP TSG RAN WG1 #86, 3GPP (Aug. 13, 2016), total 7 pages.
(Continued)

*Primary Examiner* — Steve R Young
(74) *Attorney, Agent, or Firm* — Womble Bond Dickinson (US) LLP

(57) ABSTRACT

The present application discloses an uplink LBT channel detection method, an uplink data sending method, and a device. The method includes: before transmitting a UL grant, determining, by a base station, based on a service priority in a BSR of user equipment scheduled in a self-contained subframe, a contention window required for performing LBT; and performing, by the base station, the LBT based on the contention window, and after detecting that a channel is idle, transmitting, in the self-contained subframe through the channel, a UL grant corresponding to the user equipment; or after detecting, by using the LBT, that a channel is idle, transmitting, by the base station in the self-contained subframe through the channel, a UL grant corresponding to the user equipment, where the UL grant carries information about the contention window, so that the user equipment performs the LBT based on the information about the contention window.

19 Claims, 9 Drawing Sheets

(56) References Cited

U.S. PATENT DOCUMENTS

| | | | | |
|---|---|---|---|---|
| 2017/0332395 | A1* | 11/2017 | Yin | H04W 72/1268 |
| 2018/0175975 | A1* | 6/2018 | Um | H04W 72/14 |
| 2018/0352573 | A1* | 12/2018 | Yang | H04W 72/0446 |
| 2019/0149270 | A1* | 5/2019 | Liu | H04L 12/413 |
| | | | | 370/329 |
| 2020/0305199 | A1* | 9/2020 | Harada | H04W 74/0875 |

OTHER PUBLICATIONS

Wilus Inc., R1-167788, UL Multi-carrier Transmission for eLAA, 3GPP TSG RAN WG1 #86, 3GPP (Aug. 13, 2016), total 4 pages.
Ericsson, On UL Channel Access and PUSCH Design for Enhanced LAA. 3GPP TSG RAN WG1 Meeting #84 St. Julian's, Malta, Feb. 15-19, 2016, R1-160996, 3 pages.
ZTE: "UL part in NR Frame structure for the unlicensed spectrum", 3GPP Draft, R1-166409, vol. RAN WG1, No. Gothenburg, Sweden, Aug. 13, 2016, XP051142382, 6 pages.
Qualcomm Incorporated: "Remaining details of UL LBT", 3GPP Draft, R1-166255, vol. RAN WG1, No. Gothenburg, Sweden, Aug. 21, 2016, XP051125296, 8 pages.
LG Electronics: "LBT parameter signalling in LAA", 3GPP Draft, R1-166818, vol. RAN WG1, No. Gothenburg, Sweden, Aug. 21, 2016, XP051125575, 6 pages.
CMCC: "Mapping of QCI to LBT priority class", 3GPP Draft, R2-156248, vol. RAN WG2, No. Anaheim, USA, Nov. 16, 2015, XP051040362, 6 pages.
CATT: "Uplink channel access scheme for Rel-14 eLAA", 3GPP Draft, R1-162264, vol. RAN WG1, No. Busan, Korea, Apr. 2, 2016, XP051080069, 4 pages.
Alcatel-Lucent Shanghai Bell et al: "Remaining details of single-carrier LBT", 3GPP Draft, R1-157013, vol. RAN WG1, No. Anaheim, USA, Nov. 7, 2015, XP051042121, 6 pages.

\* cited by examiner

UPLINK LBT CHANNEL DETECTION METHOD, UPLINK DATA SENDING METHOD, AND DEVICE

CROSS-REFERENCE TO RELATED APPLICATIONS

This application is a continuation of International Application No. PCT/CN2017/095293, filed on Jul. 31, 2017, which claims priority to Chinese Patent Application No. 201610811901.8, filed on Sep. 8, 2016, The disclosures of the aforementioned applications are hereby incorporated by reference in their entireties.

TECHNICAL FIELD

The present application relates to communications technologies, and in particular, to an uplink listen before talk (Listen Before Talk, LBT for short) channel detection method and an uplink data sending method that are based on a self-contained (self-contained) frame structure, and a device.

BACKGROUND

In a wireless local area network (WLAN for short), a carrier sense multiple access with collision avoidance (CSMA/CA for short) access technology is used. A node needs to perform clear channel assessment (CCA for short) first before sending data, to determine whether the channel is occupied. In addition, to ensure fairness when a plurality of nodes contend for a channel at the same time, a random back-off mechanism is further introduced. Each node selects a random back-off number based on a contention window (CW for short) corresponding to the node. When it is detected that a channel in a timeslot is idle, a corresponding back-off number is reduced, and the channel can be accessed only when random back-off ends, as shown in FIG. 1.

To improve transmission bandwidth to further improve a data transmission rate, a licensed-assisted access (LAA for short) technology is introduced to the Release 13 in 3GPP, to fully use an unlicensed band. Based on carrier aggregation, the LAA technology supports simultaneous transmitting and receiving on a plurality of carriers. A licensed band is used as a primary carrier, and the unlicensed band is used as an auxiliary subcarrier. Currently, the unlicensed band in the LAA is a 5 GHz band (which supports only downlink transmission) in the 3GPP. However, to ensure that Long Term Evolution (Long Term Evolution, LTE for short) and an existing access technology (such as Wi-Fi) can co-exist fairly and friendly, a device working on the unlicensed band needs to comply with a principle of LBT to avoid collision.

During study about the LAA in the 3GPP, four categories of LBT mechanisms are discussed.

Category 1 (Cat 1): An LBT mechanism in which no CCA detection is performed before data is sent.

Cat 2: An LBT mechanism in which no random back-off is performed.

Cat 3: A random back-off LBT mechanism in which a contention window is fixed.

Cat 4: A random back-off LBT mechanism in which a contention window is changeable.

To ensure fair co-existence with Wi-Fi, the Cat 4 LBT mechanism is used for accessing a downlink channel in the Release 13, to be specific, an eNB needs to first ensure that a channel is detected idle in a defer duration Td, and then random back-off starts. When the back-off ends, the eNB accesses the channel and obtains a corresponding maximum channel occupation time (Maximum Channel Occupation Time, MCOT for short).

An LTE system supports two frame structures: frequency division duplex (Frequency Division Duplex, FDD for short) and time division duplex (Time Division Duplex, TDD for short). There is an independent subframe for each of uplink transmission and downlink transmission. A next-generation access technology has requirements such as a high rate and a low latency. For the TDD frame structure, to avoid a strict requirement on a time sequence between subframes, a self-contained TDD frame structure is provided, to support data and ACK/NACK or control information such as uplink control information (UCI for short)/downlink control information (DCI for short) to be transmitted in a same subframe. The self-contained TDD frame structure specifically includes: a self-contained frame structure in which downlink (DL for short) prevails, as shown in FIG. 2A, and a self-contained frame structure in which uplink (UL for short) prevails, as shown in FIG. 2B.

Existing LBT mechanisms all study a frame structure of independent uplink and downlink transmission, and currently there is no feasible implementation solution for performing LBT channel detection based on a self-contained frame structure.

SUMMARY

Embodiments of the present invention provide an uplink LBT channel detection method, an uplink data sending method, and a device, to resolve a problem that existing LBT mechanisms all study a frame structure of independent uplink and downlink transmission, and currently there is no feasible implementation solution for performing LBT channel detection based on a self-contained frame structure.

According to a first aspect, an uplink LBT channel detection method is provided. The method includes:

before transmitting a UL grant, determining, by a base station based on a service priority in a BSR of user equipment scheduled in a self-contained subframe, a contention window required for performing LBT; and performing, by the base station, the LBT based on the contention window, and after detecting that a channel is idle, transmitting, in the self-contained subframe through the channel, a UL grant corresponding to the user equipment; or after detecting, by using the LBT, that a channel is idle, transmitting, by the base station in the self-contained subframe through the channel, a UL grant corresponding to the user equipment, where the UL grant carries information about the contention window, so that the user equipment performs the LBT based on the information about the contention window During implementation, the determining, by a base station based on a service priority in a BSR of user equipment scheduled in a self-contained subframe, a contention window for LBT includes the following three possible implementations:

determining, by the base station, the contention window based on a value of a lowest service priority in the BSR of the user equipment, to ensure fairness between different access technologies and between different user equipments to the greatest extent; or determining, by the base station, the contention window based on a value of a highest service priority in the BSR of the user equipment, to access a channel quickly; or determining, by the base station, the contention window based on a value of a service priority ranked in a middle position of service priorities in the BSR of the user equipment, to consider both fairness between different access technologies and between different user equipments and the speed of accessing the channel.

In one embodiment, if there are at least two user equipments scheduled in the self-contained subframe, the determining, by a base station based on a service priority in a BSR of user equipment scheduled in a self-contained subframe, a contention window for LBT includes:

determining, by the base station, a value of a lowest service priority in a BSR of each user equipment, and determining the contention window based on a maximum value in the determined service priority values, to ensure fairness between different access technologies and between different user equipments to the greatest extent; or determining, by the base station, a value of a highest service priority in a BSR of each user equipment, and determining the contention window based on a minimum value in the determined service priority values, to consider fairness between different access technologies and between different user equipments while ensuring quick access to a channel; or determining, by the base station, a value of a service priority ranked in a middle position of service priorities in a BSR of each user equipment, and determining the contention window based on the determined value of the service priority ranked in the middle position of the service priorities in the BSR of each user equipment, to improve a speed of accessing the channel while considering both fairness between different access technologies and between different user equipments and the speed of accessing the channel.

In one embodiment, the after detecting, by using the LBT, that a channel is idle, transmitting, by the base station in the self-contained subframe through the channel, a UL grant corresponding to the user equipment includes:

performing, by the base station, the channel detection by using category-2 LBT; and after detecting that a channel is idle, transmitting, by the base station in the self-contained subframe through the channel, the UL grant corresponding to the user equipment.

In one embodiment, after performing, by the base station, the LBT based on the contention window, the method further includes:

determining, by the base station, an MCOT; and if a next self-contained subframe in which UL grant is to be performed is within the MCOT, before performing the next time of UL grant, performing, by the base station, channel detection by using category-2 LBT; or if a next self-contained subframe in which UL grant is to be performed is not within the MCOT, before performing the next time of UL grant, performing, by the base station, channel detection by using category-4 LBT.

In one embodiment, the UL grant further carries indication information used for indicating a category of LBT that needs to be performed by the user equipment.

In one embodiment, if the indication information instructs the user equipment to perform category-1 LBT, after the transmitting, by the base station in the self-contained subframe through the channel, the UL grant corresponding to the user equipment, the method further includes:

sending, by the base station in a guard period GP of the self-contained subframe, data or a signal used for occupying the channel.

According to a second aspect, an uplink data sending method is provided. The uplink data sending method includes:

receiving, by user equipment, a UL grant in a self-contained subframe;

determining, by the user equipment based on the UL grant, LBT performed by the user equipment; and sending, by the user equipment, uplink data in the self-contained subframe based on the UL grant.

In one embodiment, the UL grant carries information about the contention window, and the determining, by the user equipment based on the UL grant, LBT performed by the user equipment includes:

performing, by the user equipment based on the information about the contention window, channel detection by using category-4 LBT.

In one embodiment, if the UL grant carries indication information used for indicating a category of LBT that needs to be performed by the user equipment, the determining, by the user equipment based on the UL grant, LBT performed by the user equipment includes:

determining, by the user equipment based on the indication information, a category of LBT performed by the user equipment, and performing the LBT of the corresponding category.

In one embodiment, the UL grant does not carry any parameter required for performing the LBT, and the determining, by the user equipment based on the UL grant, LBT performed by the user equipment includes:

determining, by the user equipment, not to perform LBT; or determining, by the user equipment, to perform channel detection by using category-2 LBT; or determining, by the user equipment based on a service priority in a BSR of the user equipment, a contention window required for performing LBT, and performing the LBT based on the contention window.

In one embodiment, the determining, by the user equipment based on a service priority in a BSR of the user equipment, a contention window required for performing LBT includes:

determining, by the user equipment, the contention window based on a value of a lowest service priority in the BSR; or determining, by the user equipment, the contention window based on a value of a highest service priority in the BSR; or determining, by the user equipment, the contention window based on a value of a service priority ranked in a middle position of service priorities in the BSR.

According to a third aspect, a computer readable storage medium is provided. The computer readable storage medium stores executable program code, and the program code is used to perform the method described in the first aspect.

According to a fourth aspect, a computer readable storage medium is provided. The computer readable storage medium stores executable program code, and the program code is used to perform the method described in the second aspect.

According to a fifth aspect, a base station is provided. The base station includes a module configured to perform the method in the first aspect.

According to a sixth aspect, user equipment is provided. The user equipment includes a module configured to perform the method in the second aspect.

According to a seventh aspect, a base station is provided. The base station includes a processor, a transceiver, and a memory. The processor reads a program in the memory, to perform the method in the first aspect.

According to an eighth aspect, user equipment is provided. The user equipment includes a processor, a transceiver, and a memory. The processor reads a program in the memory, to perform the method in the second aspect.

According to the method and the apparatus provided in the embodiments of the present invention, before transmitting the UL grant, the base station determines, based on the service priority in the BSR of the user equipment scheduled in the self-contained subframe, the contention window for the LBT. Then, the base station may perform the LBT channel detection based on the contention window, thereby ensuring the fairness between the different access technologies and the different user equipments, improving a probability of accessing the channel, and further preventing the user equipment from frequently performing CCA detection. After detecting that the channel is idle, the base station may alternatively send the information about the contention window to the scheduled user equipment by using the UL grant, so that the user equipment performs the LBT channel detection based on the information about the contention window, thereby ensuring the fairness between the different access technologies and the different user equipments.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present application.

The following further describes the embodiments of the present invention in detail with reference to this specification. It should be understood that the embodiments described herein are merely used to explain the present application but are not intended to limit the present application.

Figure 1:
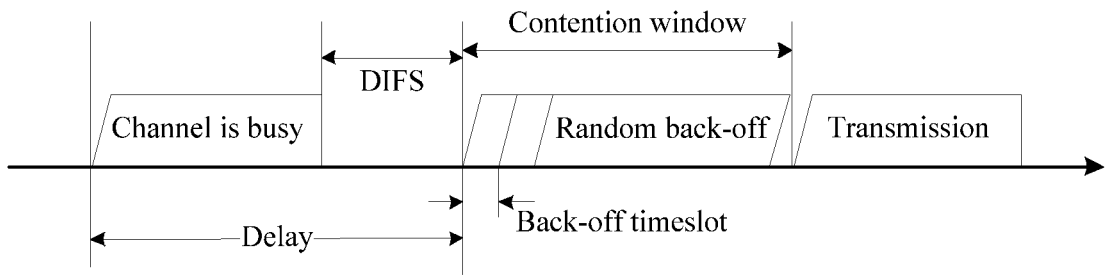
FIG. 1 is a schematic diagram of a random back-off mechanism.
Figure 2A:
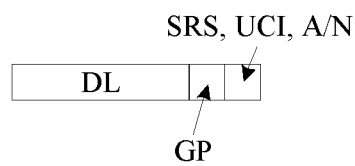
FIG. 2A is a schematic diagram of a self-contained frame structure in which downlink prevails.
Figure 2B:
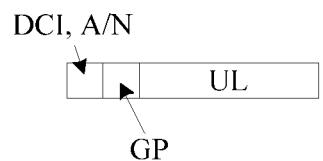
FIG. 2B is a schematic diagram of a self-contained frame structure in which uplink prevails.
Figure 3:
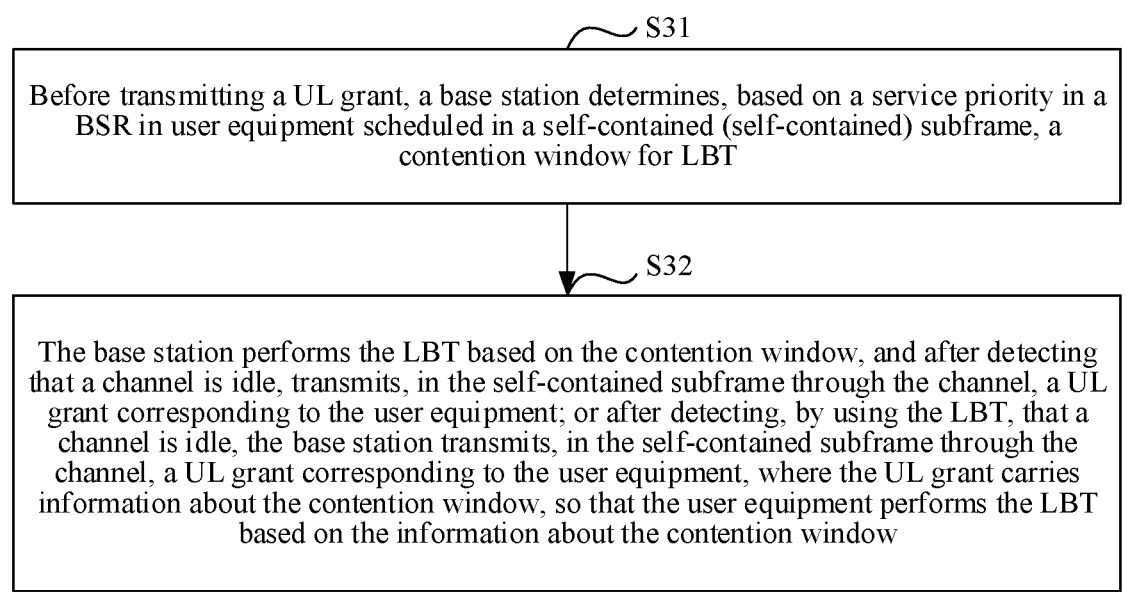
FIG. 3 is a schematic diagram of an LBT channel detection method according to an embodiment of the present invention.

In an embodiment shown in FIG. 3, an LBT channel detection method is provided. The detection method includes the following operations:

Operation S31. Before transmitting a UL grant, a base station determines, based on a service priority in a buffer status report (Buffer Status Report, BSR for short) in user equipment scheduled in a self-contained subframe, a contention window for LBT.

Operation S32. The base station performs the LBT based on the contention window, and after detecting that a channel is idle, transmits, in the self-contained subframe through the channel, a UL grant corresponding to the user equipment; or after detecting, by using the LBT, that a channel is idle, the base station transmits, in the self-contained subframe through the channel, a UL grant corresponding to the user equipment, where the UL grant carries information about the contention window, so that the user equipment performs the LBT based on the information about the contention window.

In one embodiment, the information about the contention window may be the contention window (CW), namely, a specific value of the contention window; or may be an initial value of a back-off number determined based on the contention window, to be specific, the base station randomly selects a number from 0 to CW and determines the number as an initial value of a back-off number of category-4 LBT.

Correspondingly, if the information about the contention window is the contention window, the user equipment determines an initial value of a back-off number based on the contention window, to be specific, the user equipment randomly selects a number from 0 to CW and determines the number as an initial value of a back-off number of category-4 LBT, and starts to perform random back-off. In this manner, initial values that are of back-off numbers and that are selected by different user equipments may be different.

If the information about the contention window is the initial value of the back-off number, the user equipment starts to perform random back-off by directly using the initial value of the back-off number. In this manner, initial values that are of back-off numbers and that are selected by different user equipments are the same.

In one embodiment, before transmitting the UL grant, the base station determines, based on the service priority in the BSR of the user equipment scheduled in the self-contained subframe, the contention window for the LBT. Then, the base station may perform the LBT channel detection based on the contention window, thereby ensuring the fairness between different access technologies and between the different user equipments, improving a probability of accessing the channel, and further preventing the user equipment from frequently performing CCA detection. After detecting that the channel is idle, the base station may send the information about the contention window to the scheduled user equipment by using the UL grant, so that the user equipment performs the LBT channel detection based on the information about the contention window, thereby ensuring the fairness between the different access technologies and the different user equipments.

In one embodiment, the base station performs the LBT based on the contention window, to be specific, the base station randomly selects a number from 0 to CW and determines the number as an initial value of a back-off number, and performs category-4 LBT based on the initial value of the back-off number, to perform the channel detection.

In one embodiment, if the base station performs multi-subframe scheduling, after the base station performs the LBT based on the contention window, the method further includes:

determining, by the base station, a maximum channel occupation time (Maximum Channel Occupation Time, MCOT for short); and if a next self-contained subframe in which UL grant is to be performed is within the MCOT, before performing the next time of UL grant, performing, by the base station, channel detection by using category-2 LBT; or if a next self-contained subframe in which UL grant is to be performed is not within the MCOT, before performing the next time of UL grant, performing, by the base station, channel detection by using category-4 LBT.

In one embodiment, the base station performs channel detection by using category-2 LBT, and after detecting that a channel is idle, transmits a UL grant corresponding to the user equipment in the self-contained subframe through the channel, and adds information about the contention window to the UL grant, so that the user equipment can perform the LBT based on the information about the contention window, to perform the channel detection.

In one embodiment, in S32, the UL grant sent by the base station further carries indication information used for indicating a category of LBT that needs to be performed by the user equipment, so that the user equipment can learn of a category of LBT that needs to be performed by the user equipment.

The category of LBT can include:

Cat 1 LBT in which the user equipment does not need to perform CCA detection before sending uplink data;

Cat 2 LBT in which, before sending uplink data, the user equipment needs to perform CCA detection of specified duration, for example, perform CCA detection of 25 μs;

Cat 3 LBT in which the user equipment needs to perform, before sending uplink data, random back-off LBT in which a contention window is fixed; and Cat 4 LBT in which the user equipment needs to perform, before sending uplink data, random back-off LBT in which a contention window is changeable.

In one embodiment, in S32, if the base station performs the LBT based on the contention window, and the indication information instructs the user equipment to perform category-1 LBT, after the base station sends the UL grant corresponding to the user equipment in the self-contained subframe through the channel, the method further includes:

sending, by the base station in a guard period (Guard period, GP for short) of the self-contained subframe, data or a signal used for occupying the channel, to prevent the channel from being occupied.

In one embodiment, in S31, the determining, by a base station based on a service priority in a BSR of user equipment scheduled in a self-contained subframe, a contention window for LBT includes the following three possible implementations.

Implementation 1: The base station determines the contention window based on a value of a lowest service priority in the BSR of the user equipment.

In this manner, if there is one user equipment scheduled in the self-contained subframe, the base station determines the contention window based on a value of a lowest service priority in the BSR of the user equipment, to ensure fairness between different access technologies and between different user equipments to the greatest extent; or if there are at least two user equipments scheduled in the self-contained subframe, the base station first determines a value of a lowest service priority in a BSR of each user equipment, and then determines the contention window based on a maximum value in the determined service priority values, to ensure fairness between different access technologies and between different user equipments to the greatest extent.

Certainly, when there are at least two user equipments scheduled in the self-contained subframe, the contention window may be determined in another manner. For example, the base station first determines a value of a lowest service priority in a BSR of each user equipment, and then determines the contention window based on a maximum value in the determined service priority values, so that when fairness between different access technologies and between different user equipments is ensured, a speed of accessing a channel is improved. For another example, the base station first determines a value of a lowest service priority in a BSR of each user equipment, and then determines the contention window based on a middle value in the determined service priority values, to consider a speed of accessing a channel while ensuring fairness between the different access technologies and the different user equipments. For still another example, the base station first determines a value of a lowest service priority in a BSR of each user equipment, and then determines the contention window based on an average value in the determined service priority values, to consider a speed of accessing a channel while ensuring fairness between different access technologies and between different user equipments.

Implementation 2: The base station determines the contention window based on a value of a highest service priority in a BSR of the user equipment.

In this manner, if there is one user equipment scheduled in the self-contained subframe, the base station determines the contention window based on a value of a highest service priority in the BSR of the user equipment, to access a channel quickly; or if there are at least two user equipments scheduled in the self-contained subframe, the base station first determines a value of a highest service priority in a BSR of each user equipment, and then determines the contention window based on the minimum value in the determined service priority values, to consider fairness between different access technologies and between different user equipments while ensuring quick access to a channel.

Certainly, when there are at least two user equipments scheduled in the self-contained subframe, the contention window may be determined in another manner. For example, the base station first determines a value of a highest service priority in a BSR of each user equipment, and then determines the contention window based on a maximum value in the determined service priority values, so that a speed of accessing a channel is improved to the greatest extent. For another example, the base station first determines a value of a highest service priority in a BSR of each user equipment, and then determines the contention window based on a middle value in the determined service priority values, to consider fairness between different access technologies and between different user equipments while ensuring quick access to a channel. For still another example, the base station first determines a value of a highest service priority in a BSR of each user equipment, and then determines the contention window based on an average value in the determined service priority values, to consider fairness between different access technologies and between different user equipments while ensuring quick access to a channel.

Implementation 3: The base station determines the contention window based on a value of a service priority ranked in a middle position of service priorities in the BSR of the user equipment.

In this manner, if there is one user equipment scheduled in the self-contained subframe, the base station determines the contention window based on a value of a service priority ranked in a middle position of service priorities in the BSR of the user equipment, to consider both fairness between the different access technologies and the different user equipments and the speed of accessing the channel; or if there are at least two user equipments scheduled in the self-contained subframe, the base station determines a value of a service priority ranked in a middle position of service priorities in a BSR of each user equipment, and determines the contention window based on the determined value of the service priority ranked in the middle position of the service priorities in the BSR of each user equipment, to improve a speed of accessing the channel while considering both fairness between different access technologies and between different user equipments and the speed of accessing the channel.

Certainly, when there are at least two user equipments scheduled in the self-contained subframe, the contention window may be determined in another manner. For example, the base station first determines a value of a service priority ranked in a middle position in a BSR of each user equipment, and determines the contention window based on a maximum value in the determined service priority values, to ensure fairness between different user equipments to a greater extent while considering both fairness between the different access technologies and the different user equipments and a speed of accessing a channel. For another example, the base station first determines a value of a service priority ranked in a middle position in a BSR of each user equipment, and determines the contention window based on a middle value in the determined service priority values. For still another example, the base station first determines a value of a service priority ranked in a middle position in a BSR of each user equipment, and determines the contention window based on an average value in the determined service priority values.

Based on any of the foregoing manners, when determining, based on a service priority in a BSR of user equipment scheduled in a self-contained subframe, a contention window for LBT, the base station may determine, based on a preset mapping relationship between a service priority of user equipment and a contention window (CW), the contention window corresponding to the service priority in the BSR of the scheduled user equipment.

Figure 4:
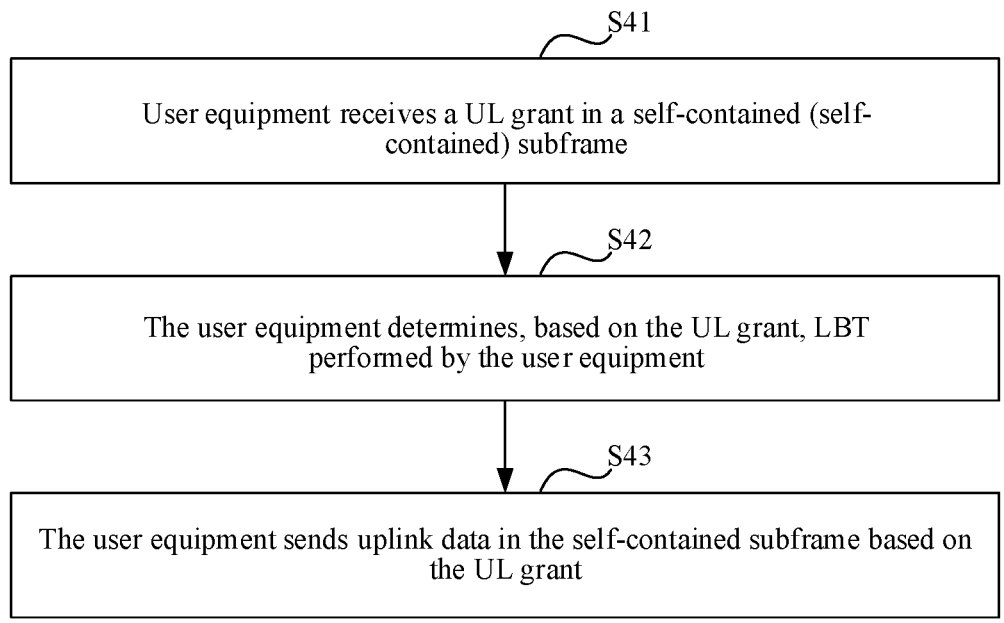
FIG. 4 is a schematic diagram of an uplink data sending method according to an embodiment of the present invention.

In an embodiment shown in FIG. 4, an uplink data sending method is provided. For the base station side, refer to the related descriptions in the embodiment shown in FIG. 3. Details are not described herein again. The method includes the following operations:

Operation S41. User equipment receives a UL grant in a self-contained subframe.

Operation S42. The user equipment determines, based on the UL grant, LBT performed by the user equipment.

Operation S43. The user equipment sends uplink data in the self-contained subframe based on the UL grant.

In one embodiment, determining, by the user equipment based on the UL grant, LBT performed by the user equipment in S42 includes:

if the UL grant carries information about a contention window, performing, by the user equipment based on the information about the contention window, channel detection by using category-4 LBT.

Specifically, if the UL grant carries the contention window (CW), namely, a specific value of the contention window, the user equipment needs to randomly select a number from 0 to CW and determine the number as an initial value of a back-off number of the category-4 LBT, and performs the channel detection based on the determined initial value of the back-off number. If the UL grant carries the initial value of the back-off number determined based on the contention window (that is, the base station randomly selects a number from 0 to CW and determines the number as the initial value of the back-off number of the category-4 LBT), the user equipment performs the channel detection based on the initial value of the back-off number.

In one embodiment, determining, by the user equipment based on the UL grant, LBT performed by the user equipment in S42 includes:

if the UL grant carries indication information used for indicating a category of LBT that needs to be performed by the user equipment, determining, by the user equipment based on the indication information, a category of LBT performed by the user equipment, and performing the LBT of the corresponding category.

Specifically, if the indication information instructs the user equipment to perform category-1 LBT, the user equipment determines not to perform CCA detection before sending the uplink data; if the indication information instructs the user equipment to perform category-2 LBT, the user equipment determines to perform, before sending the uplink data, CCA detection of specified duration, for example, perform CCA detection of 25 μs; if the indication information instructs the user equipment to perform category-3 LBT, the user equipment determines to perform, before sending the uplink data, random back-off LBT in which a contention window is fixed; or if the indication information instructs the user equipment to perform category-4 LBT, the user equipment determines to perform, before sending the uplink data, random back-off LBT in which a contention window is changeable.

In one embodiment, if the indication information instructs the user equipment to perform category-4 LBT, and the UL grant carries the information about the contention window, the user equipment performs, based on the information about the contention window, channel detection by using category-4 LBT.

In one embodiment, if the indication information instructs the user equipment to perform the category-4 LBT, and the UL grant does not carry the information about the contention window, the user equipment voluntarily determines the contention window, and uses the category-4 LBT based on the determined contention window, to perform the channel detection. Specifically, the user equipment randomly selects a number from 0 to CW and determines the number as the initial value of the back-off number, and performs the category-4 LBT based on the initial value of the back-off number, to perform the channel detection.

For some embodiments, the user equipment may determine the contention window in the following three possible implementations:

First: The user equipment determines the contention window based on a value of a lowest service priority in the BSR of the user equipment.

Second: The user equipment determines the contention window based on a value of a highest service priority in the BSR of the user equipment.

Third: The user equipment determines the contention window based on a value of a service priority ranked in a middle position of service priorities in the BSR of the user equipment.

Certainly, this embodiment of the present invention is not limited to the foregoing three manners to determine a contention window, and another manner may be used. For example, the user equipment determines a contention window based on an average value of service priorities values in the BSR of the user equipment. This is not limited in this embodiment of the present invention.

In one embodiment, determining, by the user equipment based on the UL grant, LBT performed by the user equipment in S42 includes:

if the UL grant does not carry any parameter required for performing the LBT, determining, by the user equipment, not to perform LBT; or determining, by the user equipment, to perform channel detection by using category-2 LBT; or determining, by the user equipment based on a service priority in a BSR of the user equipment, a contention window required for performing LBT, and performing the LBT based on the contention window.

Specifically, if the UL grant does not carry any parameter required for performing the LBT, a preferred manner is that the user equipment determines, based on a service priority in the BSR of the user equipment, a contention window required for performing the LBT, and performs the LBT based on the contention window.

The following describes in detail the method provided in some embodiments of the present invention.

One embodiment describes a scenario in which scheduling is performed on a single self-contained subframe. In this embodiment, before transmitting a UL grant, the base station contends for a channel by using Cat 4 LBT, to be specific, the base station needs to first detect that a channel is idle in a defer duration Td, and then starts to perform random back-off. A back-off process can be as follows.

(1) The base station selects a corresponding contention window CW, and randomly selects a value from 0 to CW as an initial value No of the random back-off.

(2) The base station determines whether $N_i$ is greater than 0, and if $N_i$ is not greater than 0, the back-off ends; or if $N_i$ is greater than 0, namely, $N_i>0$, it is enabled that $N_{i+1}=N_i-1$, where i=0, 1 . . . .

(3) The base station performs CCA detection in a timeslot Ts, and if the channel is idle, return to (2); or if the channel is busy, proceed to (4).

(4) The base station performs CCA detection in an additional defer duration Td, and if the channel is idle, return to (2); or if the channel is busy, return to (4).

After the back-off of the base station ends, the base station accesses a channel to transmit the UL grant, and obtains a corresponding maximum channel occupation time (Maximum Channel Occupation Time, MCOT for short). For a subsequent subframe, if the subframe is within the MCOT, the base station performs Cat 2 LBT before transmitting the UL grant; or if the subframe is not within the MCOT, the base station needs to re-contend for a channel by using Cat 4 LBT.

Figure 5:
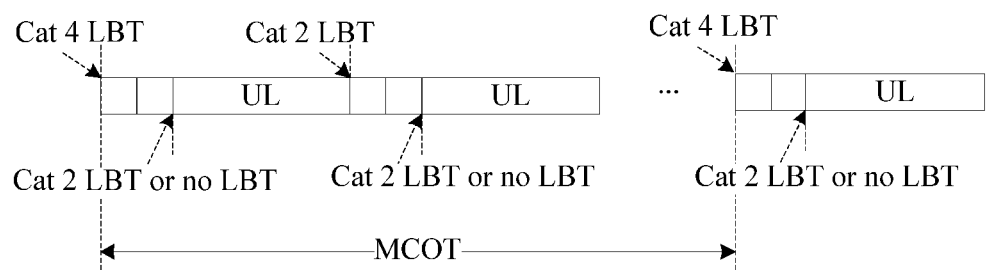
FIG. 5 is a schematic diagram of performing LBT in Embodiment 1 according to the present invention.

Correspondingly, after receiving the UL grant, the scheduled user equipment performs the Cat 2 LBT based on an indication of the UL grant or directly sends data. A specific process is shown in FIG. 5.

In one embodiment, for a specific solution used by the base station for determining the contention window CW required for performing the LBT, refer to the related descriptions in the embodiment shown in FIG. 3. Details are not described herein again.

In one embodiment, the UL grant carries indication information indicating that the user equipment does not need to perform the LBT before sending the uplink data.

Correspondingly, after receiving the UL grant, the scheduled user equipment directly sends the uplink data without performing the LBT.

In this manner, after the base station sends the UL grant corresponding to the user equipment in the self-contained subframe through the channel, the method further includes:

sending, by the base station in a guard period GP of the self-contained subframe, data or a signal used for occupying the channel, to prevent the channel from being occupied.

In one embodiment, if the UL grant includes indication information used for instructing the user equipment to perform category-2 LBT before sending the uplink data, or the UL grant does not include any indication information used for instructing the user equipment to perform the LBT before sending the uplink data, after the scheduled user equipment receives the UL grant, the scheduled user equipment performs the channel detection by using the category-2 LBT, and after determining that the channel is idle, sends the uplink data in the self-contained subframe through the channel.

Specifically, after receiving the UL grant, the scheduled user equipment performs CCA detection of 25 μs, and when it is detected that a channel is idle, sends the uplink data in the self-contained subframe through the channel.

Figure 6:
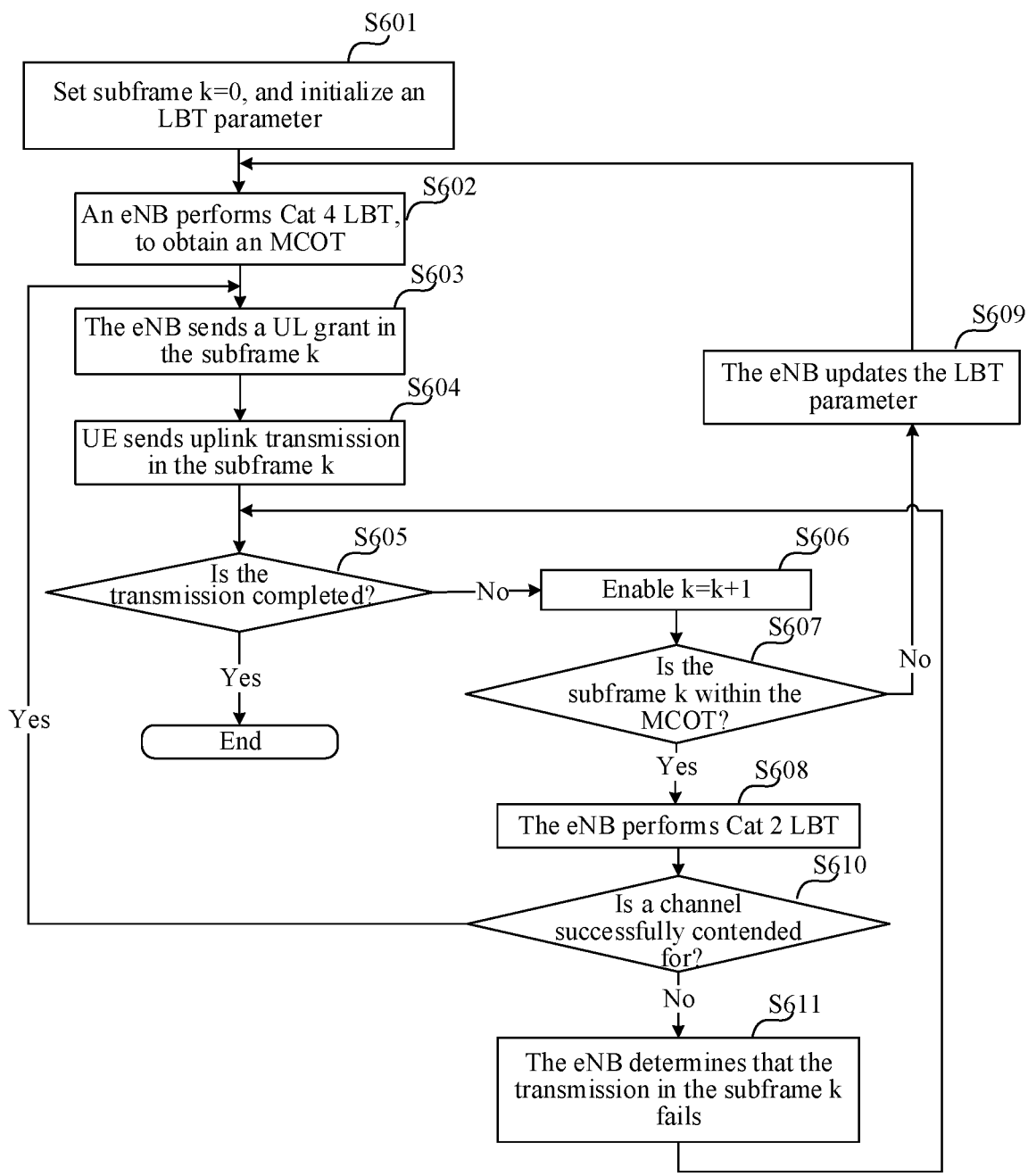
FIG. 6 is a schematic flowchart of Embodiment 1 according to the present invention.

A specific procedure of one embodiment is shown in FIG. 6 and includes the following operations.

Operation S601. Configure an initial value of a subframe k, namely, k=0, and initialize an LBT parameter.

Operation S602. An eNB contends for a channel by using Cat 4 LBT, and obtains an MCOT after successfully contending for a channel.

Specifically, the eNB selects a contention window CW based on a service priority in a BSR of UE scheduled in the subframe k, and randomly selects a number from 0 to CW and uses the number as an initial value of a back-off number.

Operation S603. The eNB transmits a UL grant (UL grant) in the subframe k.

Specifically, the base station transmits the UL grant to the scheduled UE, and instructs, by using the UL grant, the UE to perform Cat 2 LBT or not to perform LBT before sending data.

Further, if the eNB instructs, by using the UL grant, that the UE does not perform LBT before sending data, the eNB needs to fill the guard period GP with data or send a reservation signal to prevent the channel from being occupied.

Operation S604. The eNB sends uplink data (UL transmission) in the subframe k.

Specifically, after the UE scheduled by the eNB receives the UL grant, the UE performs Cat 2 LBT based on the UL grant, and sends the uplink data after successfully contending for a channel, or directly sends the uplink data.

Operation S605. The eNB determines whether the transmission is completed, and
if the transmission is completed, the procedure ends; or
if the transmission is not completed, the eNB performs S606.

Operation S606. The eNB enables k=k+1.

Operation S607. The eNB determines whether the subframe k is within the MCOT.
if the subframe k is within the MCOT, performs S608; or if the subframe k is not within the MCOT, performs S609.

Operation S608. Before transmitting the UL grant, the eNB performs Cat 2 LBT, and proceed to S610.

Operation S610. Determine whether a channel is successfully contended for.
if a channel is successfully contended for, return to operation S603; or if a channel is not successfully contended for, perform operation S611.

Operation S611. The eNB determines that the transmission in the subframe k fails, and return to operation S605.

Operation S609. The eNB updates the LBT parameter, and return to operation S602.

Specifically, the eNB re-selects an LBT parameter based on the BSR of the UE scheduled in the subframe k.

Figure 7:
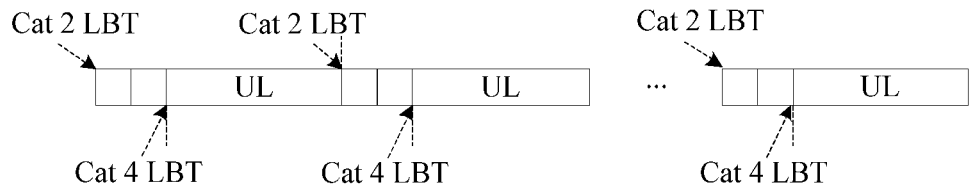
FIG. 7 is a schematic diagram of performing LBT in Embodiment 2 according to the present invention.

One embodiment describes another scenario in which scheduling is performed on a single self-contained subframe. In this embodiment, before transmitting the UL grant, the base station contends for a channel by using Cat 2 LBT, and determines at the same time based on a service priority in a BSR of the scheduled user equipment, a parameter required for performing Cat 4 LBT by the user equipment, for example, a contention window CW required for performing the LBT. After successfully contending for a channel, the base station adds the LBT parameter required by the user equipment to the UL grant and sends the parameter. After receiving the UL grant, the scheduled user equipment performs Cat 4 LBT based on an indication by using the corresponding parameter, and sends the uplink data after successfully contending for the channel. If the LBT fails, the uplink data cannot be sent, as shown in FIG. 7.

In one embodiment, for a method of determining, based on the service priority in the BSR of the scheduled user equipment, the contention window CW required for performing the LBT, refer to the related descriptions in Embodiment 2. Details are not described herein again.

Figure 8:
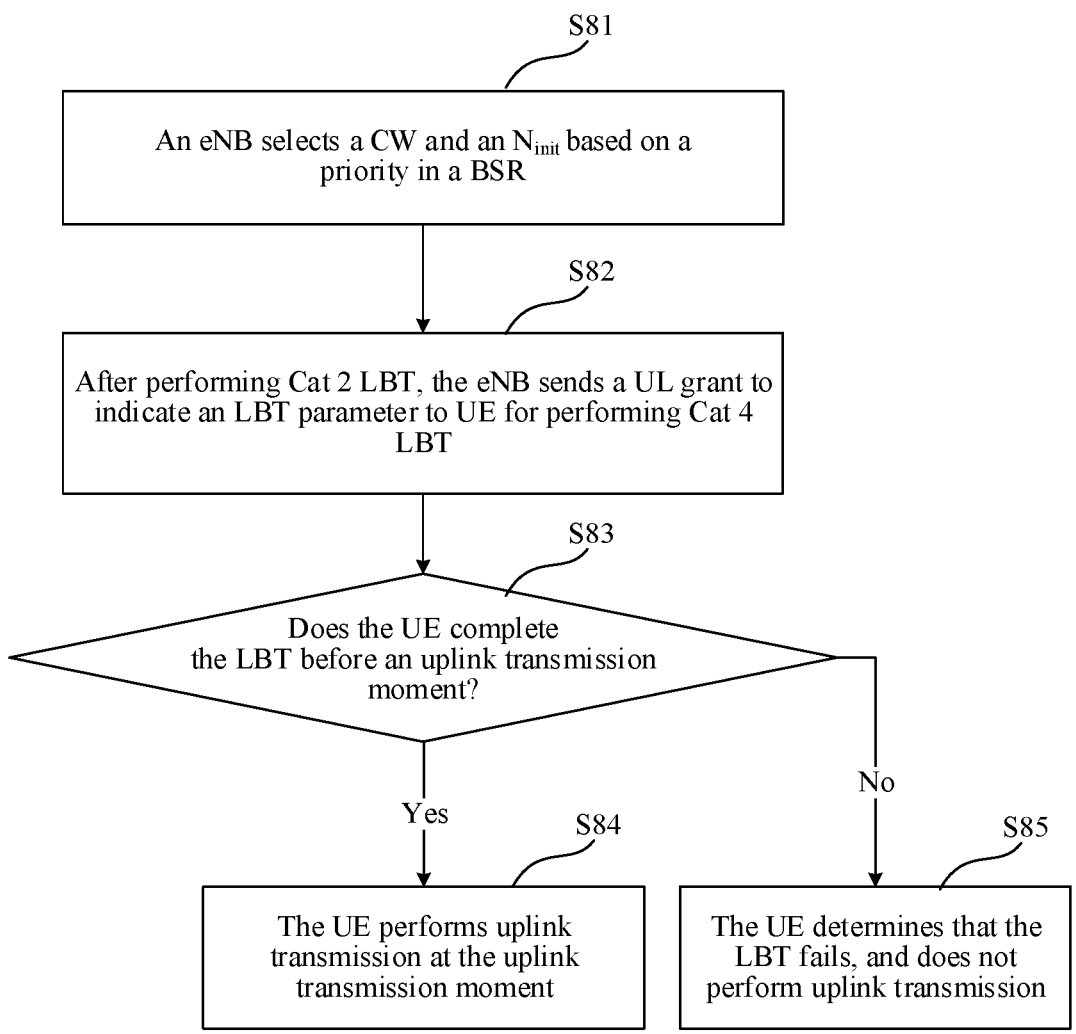
FIG. 8 is a schematic flowchart of Embodiment 2 according to the present invention.

A specific procedure of one embodiment is shown in FIG. 8 and includes the following operations.

Operation S81. The eNB determines an LBT parameter.

Specifically, the eNB selects a contention window CW based on the service priority in the BSR of the user equipment scheduled in the subframe, and randomly selects a number from 0 to CW and uses the number as an initial value of a back-off number.

Operation S82. The eNB performs Cat 2 LBT, and transmits a UL grant after successfully contending for a channel, where the UL grant carries the LBT parameter.

Operation S83. Determine whether the scheduled UE completes the LBT before an uplink transmission moment.

Specifically, after receiving the UL grant, the scheduled UE performs Cat 4 LBT based on the LBT parameter, and determines whether the LBT is completed at the uplink transmission moment indicated by UL grant; and
if the LBT is completed at the uplink transmission moment indicated by UL grant, perform S84; or
if the LBT is not completed at the uplink transmission moment indicated by UL grant, perform S85.

Operation S84. The scheduled UE performs uplink transmission at the uplink transmission moment indicated by the UL grant, where transmission of a plurality of user equipments that are scheduled at the same time should be aligned.

Operation S85. The scheduled UE determines that the LBT fails, and does not perform uplink transmission.

One embodiment describes a scenario in which scheduling is performed in a plurality of subframes. In this embodiment, the UL grant of the base station may be used to schedule a plurality of subframes. Before transmitting the UL grant, the base station contends for a channel by using Cat 4 LBT, and accesses the channel after back-off ends, to obtain a maximum channel occupation time MCOT. The base station transmits the UL grant, and adds, to the UL grant, indication information used for indicating a category of LBT that needs to be performed by the scheduled user equipment in each self-contained subframe.

Figure 9A:
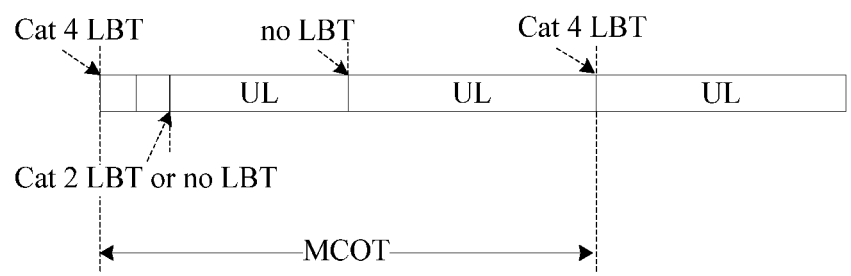
FIG. 9A is a schematic diagram of performing LBT in Embodiment 3 according to the present invention.
Figure 9B:
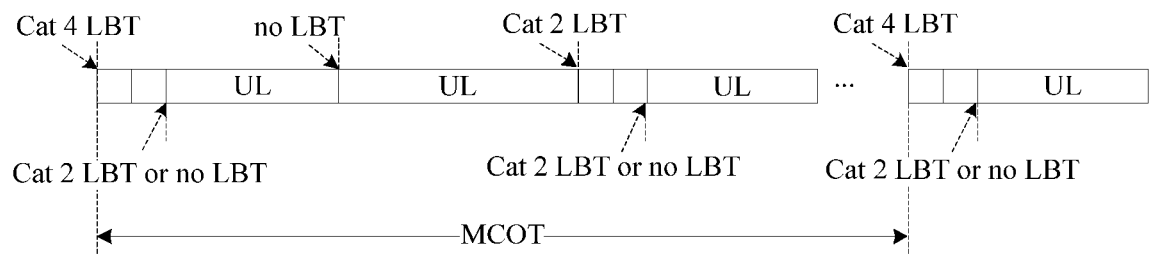
FIG. 9B is another schematic diagram of performing LBT in Embodiment 3 according to the present invention.

As shown in FIG. 9A and FIG. 9B, for uplink transmission in a current subframe, after receiving the UL grant, the scheduled user equipment performs Cat 2 LBT based on the indication or directly sends data. For an uplink subframe that is continuously scheduled subsequently, if the uplink subframe is within the MCOT, the scheduled user equipment does not need to perform LBT before sending the uplink data; or otherwise, the scheduled user equipment needs to perform Cat 4 LBT. Likewise, for a next time of transmitting the UL grant, if a subframe in which the UL grant is located is within the MCOT next time, the base station performs Cat 2 LBT before transmitting the UL grant; or otherwise, the base station performs Cat 4 LBT before transmitting the UL grant.

Figure 10:
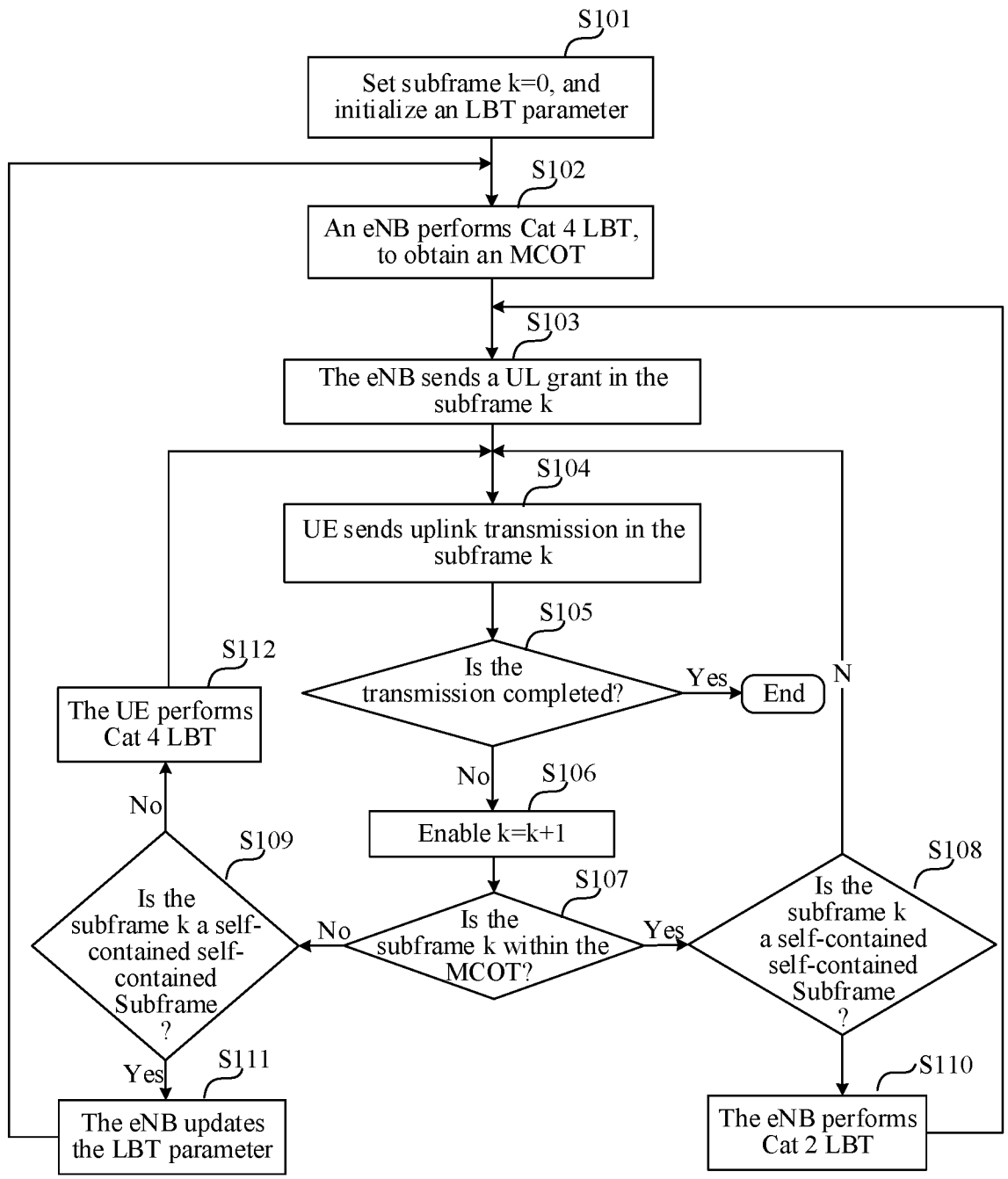
FIG. 10 is a schematic flowchart of Embodiment 3 according to the present invention.

A specific procedure of an embodiment is shown in FIG. 10 and includes the following operations.

Operation S101. Configure an initial value of a subframe k, namely, k=0, and initialize an LBT parameter.

Specifically, the eNB selects a contention window CW based on the service priority in the BSR of the user equipment scheduled in the subframe k, and randomly selects a number from 0 to CW and uses the number as an initial value of a back-off number.

Operation S102. An eNB contends for a channel by using Cat 4 LBT, and obtains an MCOT after successfully contending for a channel.

Operation S103. The eNB transmits a UL grant in the subframe k.

Specifically, the eNB transmits the UL grant, and the UL grant is used to indicate, to the scheduled UE, an LBT category such as Cat 2 LBT or no LBT or Cat 4 LBT that needs to be used by the UE before sending data in each subframe. For a current subframe, if it is indicated that the UE does not perform LBT before sending data, the eNB needs to fill the guard period GP with data or send a reservation signal to prevent the channel from being occupied. For an uplink subframe that is scheduled subsequently, if the subframe is within an MCOT, the UE does not perform LBT before sending the uplink data; or otherwise, the UE performs Cat 4 LBT based on an LBT parameter before sending the uplink data, where the LBT parameter may be obtained from the UL grant.

Operation S104. UE performs uplink transmission in the subframe k.

Specifically, after receiving the UL grant, the scheduled UE performs Cat 2 LBT or Cat 4 LBT based on the UL grant, and the UE performs uplink transmission after successfully contending for a channel, or directly performs the uplink transmission.

Operation S105. The eNB determines whether the transmission is completed; and if the transmission is completed, the procedure ends; or if the transmission is not completed, perform operation S106.

Operation S106. The eNB enables k=k+1.

Operation S107. The eNB determines whether the subframe k is within the MCOT; and if the subframe k is within the MCOT, perform operation S108; or if the subframe k is not within the MCOT, perform operation S109.

Operation S108. The eNB determines whether the subframe k is a self-contained subframe; and if the subframe k is a self-contained subframe, perform operation S110; or if the subframe k is not a self-contained subframe, return to operation S104.

Operation S109. The eNB determines whether the subframe k is a self-contained subframe; and if the subframe k is a self-contained subframe, perform operation S111; or if the subframe k is not a self-contained subframe, perform operation S112.

Operation S110. The eNB performs Cat 2 LBT before transmitting the UL grant, and return to operation S103 after a channel is successfully contended for.

Operation S111. The eNB updates the LBT parameter, and return to operation S102.

Specifically, the eNB re-selects an LBT parameter based on the BSR of the user equipment scheduled in the subframe k.

Operation S112. The UE performs Cat 4 LBT, and return to operation S104 after a channel is successfully contended for.

The processing procedure of the foregoing method may be implemented using a software program, the software program may be stored in a storage medium, and when the stored software program is invoked, the operations of the foregoing method are performed.

Based on a same concept, an embodiment of the present invention further provides a base station. Because a principle of resolving a problem by the base station is similar to the method shown in the embodiment in FIG. 3, for the implementation of the base station, refer to the implementation of the method. No repeated description is provided.

Figure 11:
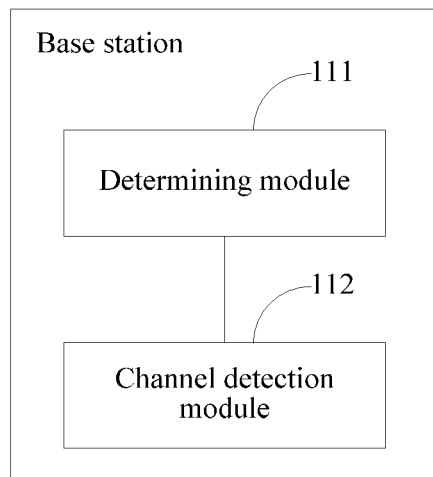
FIG. 11 is a schematic diagram of a base station according to an embodiment of the present invention.

In an embodiment shown in FIG. 11, a base station is provided. The base station includes:

a determining module 111, configured to: before transmitting a UL grant, determine, based on a service priority in a BSR of user equipment scheduled in a self-contained subframe, a contention window required for performing LBT; and a channel detection module 112, configured to: perform the LBT based on the contention window, and after detecting that a channel is idle, transmit, in the self-contained subframe through the channel, a UL grant corresponding to the user equipment; or after detecting, by using the LBT, that a channel is idle, transmit, in the self-contained subframe through the channel, a UL grant corresponding to the user equipment, where the UL grant carries information about the contention window, so that the user equipment performs the LBT based on the information about the contention window.

In one embodiment, the determining module 111 is specifically configured to:

determine the contention window based on a value of a lowest service priority in the BSR of the user equipment; or determine the contention window based on a value of a highest service priority in the BSR of the user equipment; or determine the contention window based on a value of a service priority ranked in a middle position of service priorities in the BSR of the user equipment. For details, refer to the related descriptions in the embodiment shown in FIG. 3. Details are not described herein again.

In one embodiment, if there are at least two user equipments scheduled in the self-contained subframe, the determining module 111 is specifically configured to:

determine a value of a lowest service priority in a BSR of each user equipment, and determine the contention window based on a maximum value in the determined service priority values; or determine a value of a highest service priority in a BSR of each user equipment, and determine the contention window based on a minimum value in the determined service priority values; or determine a value of a service priority ranked in a middle position of service priorities in a BSR of each user equipment, and determine the contention window based on the determined value of the service priority ranked in the middle position of the service priorities in the BSR of each user equipment. For details, refer to the related descriptions in the embodiment shown in FIG. 3. Details are not described herein again.

In one embodiment, the channel detection module 112 is specifically configured to:

perform channel detection by using category-2 LBT; and after detecting that a channel is idle, transmit, in the self-contained subframe through the channel, the UL grant corresponding to the user equipment. For details, refer to the related descriptions in the embodiment shown in FIG. 3. Details are not described herein again.

In one embodiment, after performing the LBT based on the contention window, the channel detection module 112 is further configured to:

determine a maximum channel occupation time MCOT; and if a next self-contained subframe in which UL grant is to be performed is within the MCOT, before performing the next time of UL grant, perform channel detection by using category-2 LBT; or if a next self-contained subframe in which UL grant is to be performed is not within the MCOT, before performing the next time of UL grant, perform channel detection by using category-4 LBT. For details, refer to the related descriptions in the embodiment shown in FIG. 3. Details are not described herein again.

In one embodiment, the UL grant further carries indication information used for indicating a category of LBT that needs to be performed by the user equipment. For details, refer to the related descriptions in the embodiment shown in FIG. 3. Details are not described herein again.

In one embodiment, if the indication information instructs the user equipment to perform category-1 LBT, after transmitting, in the self-contained subframe through the channel, the UL grant corresponding to the user equipment, the channel detection module is further configured to: send, in a guard period GP of the self-contained subframe, data or a signal used for occupying the channel.

Figure 12:
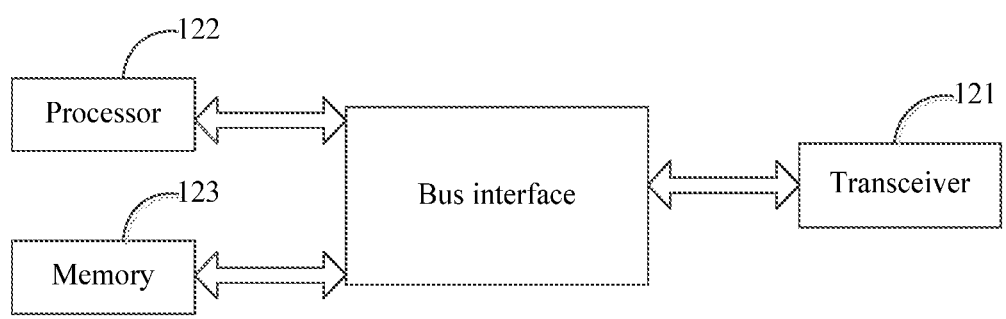
FIG. 12 is a schematic diagram of another base station according to an embodiment of the present invention.

In an embodiment shown in FIG. 12, another base station is provided. The base station includes a transceiver 121, a processor 122, and a memory 123.

In one embodiment, the processor 122 reads a program in the memory 123, to perform the following process:

before transmitting a UL grant, determining, based on a service priority in a BSR of user equipment scheduled in a self-contained subframe, a contention window required for performing LBT; and performing the LBT based on the contention window, and after detecting that a channel is idle, controlling the transceiver 121 to transmit, in the self-contained subframe through the channel, a UL grant corresponding to the user equipment; or after detecting, by using the LBT, that a channel is idle, controlling the transceiver 121 to transmit, in the self-contained subframe through the channel, a UL grant corresponding to the user equipment, where the UL grant carries information about the contention window, so that the user equipment performs the LBT based on the information about the contention window The transceiver 121 can be configured to receive and send data under the control of the processor 122.

In FIG. 12, in one embodiment, a bus architecture may include any quantity of interconnected buses and bridges, and specifically connects together circuits that are of one or more processors represented by the processor 122 and of a memory represented by a memory 123. The bus architecture may further connect various other circuits of a peripheral device, a voltage regulator, a power management circuit, and the like. This is well known in the art, and therefore, no further description is provided in this specification. The bus interface provides an interface. The transceiver 121 may be one element, or may be a plurality of elements, for example, a plurality of transceivers and receivers, and provide a unit configured to communicate with another apparatus on a storage medium. The processor 122 is responsible for management of the bus architecture and general processing, and may further provide various functions, including timing, a function of a peripheral interface, voltage regulation, power management, and another control function. The memory 123 may store data used by the processor 122 when the processor 122 performs an operation.

In one embodiment, the processor 122 may be a central processing unit (CPU), an application-specific integrated circuit (Application Specific Integrated Circuit, ASIC for short), a field-programmable gate array (Field-Programmable Gate Array, FPGA for short) or a complex programmable logical device (Complex Programmable Logic Device, CPLD for short).

In one embodiment, for the processing that is performed by the processor 122, specifically refer to the related descriptions of the determining module 111 and the channel detection module 112 in the embodiment shown in FIG. 11. Details are not described herein again.

Based on a same concept, an embodiment of the present invention further provides user equipment. Because a principle of resolving a problem by the user equipment is similar to the method shown in the embodiment in FIG. 4, for the implementation of the user equipment, refer to the implementation of the method. No repeated description is provided.

Figure 13:
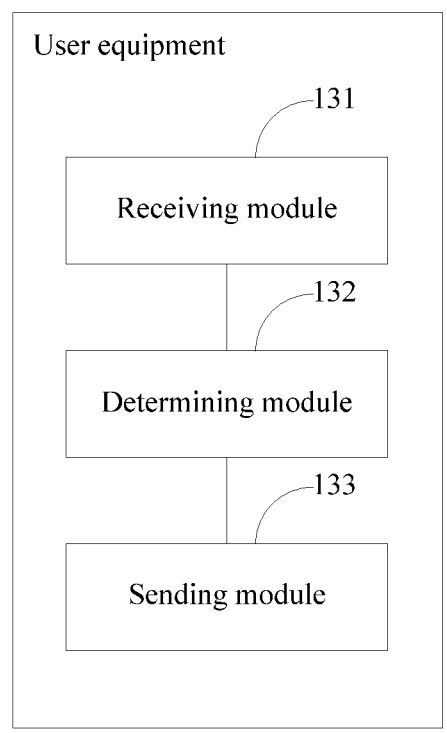
FIG. 13 is a schematic diagram of user equipment according to an embodiment of the present invention.

In an embodiment shown in FIG. 13, user equipment is provided. The user equipment includes:

a receiving module 131, configured to receive a UL grant in a self-contained subframe;

a determining module 132, configured to determine, based on the UL grant, LBT performed by the user equipment; and a sending module 133, configured to send uplink data in the self-contained subframe based on the UL grant.

In one embodiment, the UL grant carries information about the contention window. The determining module 132 is specifically configured to: perform channel detection based on the information about the contention window by using category-4 LBT.

In one embodiment, if the UL grant carries indication information used for indicating a category of LBT that needs to be performed by the user equipment, the determining module 132 is specifically configured to: determine, based on the indication information, a category of LBT performed by the user equipment, and perform the LBT of the corresponding category.

In one embodiment, the UL grant does not carry any parameter required for performing the LBT, and the determining module 132 is specifically configured to:

determine not to perform LBT; or determine to perform channel detection by using category-2 LBT; or determine, based on a service priority in a BSR of the user equipment, a contention window required for performing LBT, and perform the LBT based on the contention window.

In one embodiment, the determining module 132 is specifically configured to:

determine the contention window based on a value of a lowest service priority in the BSR; or determine the contention window based on a value of a highest service priority in the BSR; or determine, based on a value of a service priority ranked in a middle position of service priorities in the BSR, the contention window.

Figure 14:
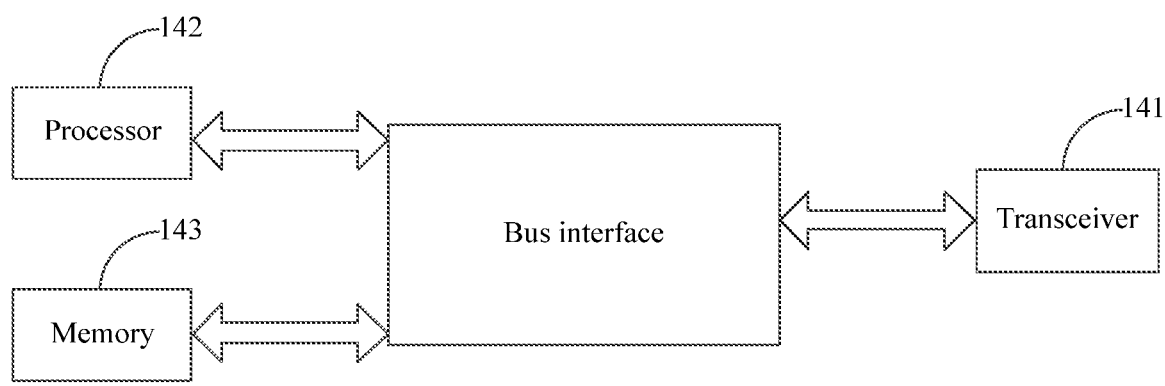
FIG. 14 is a schematic diagram of another user equipment according to an embodiment of the present invention.

In an embodiment shown in FIG. 14, another user equipment is provided. The user equipment includes a transceiver 141, a processor 142, and a memory 143.

The processor 142 reads a program in the memory 143, to perform the following process:

receiving the UL grant in a self-contained subframe by using the transceiver 141; determining, based on the UL grant, LBT performed by the processor 142; and controlling, based on the UL grant, the transceiver 141 to send uplink data in the self-contained subframe.

In FIG. 14, a bus architecture may include any quantity of interconnected buses and bridges, and specifically connects together circuits that are of one or more processors represented by the processor 142 and of a memory represented by a memory 143. The bus architecture may further connect various other circuits of a peripheral device, a voltage regulator, a power management circuit, and the like. This is well known in the art, and therefore, no further description is provided in this specification. The bus interface provides an interface. The transceiver 141 may be one element, or may be a plurality of elements, for example, a plurality of transceivers and receivers, and provide a unit configured to communicate with another apparatus on a storage medium. The processor 142 is responsible for management of the bus architecture and general processing, and may further provide various functions, including timing, a function of a peripheral interface, voltage regulation, power management, and another control function. The memory 143 may store data used by the processor 142 when the processor 142 performs an operation.

In one embodiment, the processor 142 may be a CPU, an ASIC, an FPGA, or a CPLD.

In this embodiment of the present invention, for the processing that is performed by the processor 142, specifically refer to the related descriptions of the receiving module 131, the determining module 132, and the sending module 133 in the embodiment shown in FIG. 13. Details are not described herein again.

Persons skilled in the art should understand that the embodiments of the present invention may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions performed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions performed on the computer or the another programmable device provide operations for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the scope of the present application. The present application is intended to cover these modifications and variations provided that they fall within the scope of protection defined by the following claims and their equivalent technologies.

What is claimed is:

1. An uplink (UL) listen before talk (LBT) channel detection method, comprising:
before transmitting a UL grant, determining, by a base station based on a service priority in a buffer status report (BSR) of user equipment scheduled in a self-contained subframe, a contention window required for performing LBT; and
performing, by the base station, the LBT based on the contention window, and after detecting that a channel is idle, transmitting, in the self-contained subframe through the channel, a UL grant corresponding to the user equipment; or after detecting, by using the LBT, that a channel is idle, transmitting, by the base station in the self-contained subframe through the channel, a UL grant corresponding to the user equipment, wherein the UL grant carries information about the contention window, so that the user equipment performs the LBT based on the information about the contention window, wherein if there are at least two user equipments scheduled in the self-contained subframe;
determining a value of a lowest service priority in the BSR, and determine the contention window based on a maximum value in the determined service priority values; or
determining a value of a highest service priority in a BSR of each user equipment, and determine the contention window based on a minimum value in the determined service priority values; or
determining a value of a service priority ranked in a middle position of service priorities in a BSR of each user equipment, and determine the contention window based on the determined value of the service priority ranked in the middle position of the service priorities in the BSR of each user equipment.

2. The method according to claim 1, wherein the determining, by a base station based on a service priority in a BSR of user equipment scheduled in a self-contained subframe, a contention window for LBT comprises:
determining, by the base station, the contention window based on a value of a lowest service priority in the BSR of the user equipment; or
determining, by the base station, the contention window based on a value of a highest service priority in the BSR of the user equipment; or
determining, by the base station, the contention window based on a value of a service priority ranked in a middle position of service priorities in the BSR of the user equipment.

3. The method according to claim 1, wherein after the performing, by the base station, the LBT based on the contention window, the method further comprises:
determining, by the base station, a maximum channel occupation time (MCOT); and
if a next self-contained subframe in which UL grant is to be performed is within the MCOT, before performing a next time of UL grant, performing, by the base station, channel detection by using category-2 LBT; or
if a next self-contained subframe in which UL grant is to be performed is not within the MCOT, before performing a next time of UL grant, performing, by the base station, channel detection by using category-4 LBT.

4. The method according to claim 1, wherein the UL grant further carries indication information used for indicating a category of LBT that needs to be performed by the user equipment.

5. An uplink data sending method, comprising:
receiving, by user equipment, an uplink (UL) grant in a self-contained subframe;
determining, by the user equipment based on the UL grant, listen before talk (LBT) performed by the user equipment; and
sending, by the user equipment, uplink data in the self-contained subframe based on the UL grant.

6. The method according to claim 5, wherein if the UL grant carries information about a contention window, the determining, by the user equipment based on the UL grant, LBT performed by the user equipment comprises:
performing, by the user equipment based on the information about the contention window, channel detection by using category-4 LBT.

7. The method according to claim 5, wherein if the UL grant carries indication information used for indicating a category of LBT that needs to be performed by the user equipment, the determining, by the user equipment based on the UL grant, LBT performed by the user equipment comprises:

determining, by the user equipment based on the indication information, a category of LBT performed by the user equipment, and performing the LBT of the corresponding category.

8. The method according to claim 5, wherein if the UL grant does not carry any parameter required for performing the LBT, the determining, by the user equipment based on the UL grant, LBT performed by the user equipment comprises:

determining, by the user equipment, not to perform LBT; or determining, by the user equipment, to perform channel detection by using category-2 LBT; or determining, by the user equipment based on a service priority in a buffer status report BSR of the user equipment, a contention window required for performing LBT, and performing the LBT based on the contention window.

9. The method according to claim 8, wherein the determining, by the user equipment based on a service priority in a buffer status report BSR of the user equipment, a contention window required for performing LBT comprises:

determining, by the user equipment, the contention window based on a value of a lowest service priority in the BSR; or determining, by the user equipment, the contention window based on a value of a highest service priority in the BSR; or determining, by the user equipment, the contention window based on a value of a service priority ranked in a middle position of service priorities in the BSR.

10. A base station, comprising:
a processor; and
a non-transitory computer-readable storage medium coupled to the processor and storing programming instructions for execution by the processor, the programming instructions instruct the processor to:
before transmitting an uplink (UL) grant, determine, based on a service priority in a buffer status report (BSR) of user equipment scheduled in a self-contained subframe, a contention window required for performing listen before talk (LBT); and
perform the LBT based on the contention window, and after detecting that a channel is idle, transmit, in the self-contained subframe through the channel, a UL grant corresponding to the user equipment; or after detecting, by using the LBT, that a channel is idle, transmit, in the self-contained subframe through the channel, a UL grant corresponding to the user equipment, wherein the UL grant carries information about the contention window, so that the user equipment performs the LBT based on the information about the contention window, wherein if there are at least two user equipments scheduled in the self-contained subframe, the programming instructions instruct the processor to:
determine a value of a lowest service priority in a BSR of each user equipment, and determine the contention window based on a maximum value in the determined service priority values; or
determine a value of a highest service priority in a BSR of each user equipment, and determine the contention window based on a minimum value in the determined service priority values; or
determine a value of a service priority ranked in a middle position of service priorities in a BSR of each user equipment, and determine the contention window based on the determined value of the service priority ranked in the middle position of the service priorities in the BSR of each user equipment.

11. The base station according to claim 10, wherein the programming instructions instruct the processor to:
determine the contention window based on a value of a lowest service priority in the BSR of the user equipment; or determine the contention window based on a value of a highest service priority in the BSR of the user equipment; or determine the contention window based on a value of a service priority ranked in a middle position of service priorities in the BSR of the user equipment.

12. The base station according to claim 10, wherein the programming instructions instruct the processor to:
perform channel detection by using category-2 LBT; and after detecting that a channel is idle, transmit, in the self-contained subframe through the channel, the UL grant corresponding to the user equipment.

13. The base station according to claim 12, wherein after performing the LBT based on the contention window, the programming instructions instruct the processor to:
determine a maximum channel occupation time (MCOT); and if a next self-contained subframe in which UL grant is to be performed is within the MCOT, before performing a next time of UL grant, perform channel detection by using category-2 LBT; or if a next self-contained subframe in which UL grant is to be performed is not within the MCOT, before performing the next time of UL grant, perform channel detection by using category-4 LBT.

14. The base station according to claim 12, wherein the UL grant further carries indication information used for indicating a category of LBT that needs to be performed by the user equipment.

15. A non-transitory computer-readable storage medium coupled to a processor and storing programming instructions for execution by the processor, the programming instructions instruct the processor to:
before transmitting an uplink (UL) grant, determine, based on a service priority in a buffer status report (BSR) of user equipment scheduled in a self-contained subframe, a contention window required for performing listen before talk (LBT); and
perform the LBT based on the contention window, and after detecting that a channel is idle, transmit, in the self-contained subframe through the channel, a UL grant corresponding to the user equipment; or after detecting, by using the LBT, that a channel is idle, transmit, in the self-contained subframe through the channel, a UL grant corresponding to the user equipment, wherein the UL grant carries information about the contention window, so that the user equipment performs the LBT based on the information about the contention window, wherein if there are at least two user equipments scheduled in the self-contained subframe, the programming instructions instruct the processor to:

determine a value of a lowest service priority in a BSR of each user equipment, and determine the contention window based on a maximum value in the determined service priority values; or determine a value of a highest service priority in a BSR of each user equipment, and determine the contention window based on a minimum value in the determined service priority values; or determine a value of a service priority ranked in a middle position of service priorities in a BSR of each user equipment, and determine the contention window based on the determined value of the service priority ranked in the middle position of the service priorities in the BSR of each user equipment.

16. The non-transitory computer-readable storage medium according to claim 15, wherein the programming instructions instruct the processor to:

determine the contention window based on a value of a lowest service priority in the BSR of the user equipment; or determine the contention window based on a value of a highest service priority in the BSR of the user equipment; or determine the contention window based on a value of a service priority ranked in a middle position of service priorities in the BSR of the user equipment.

17. The non-transitory computer-readable storage medium according to claim 15, wherein the programming instructions instruct the processor to:

perform channel detection by using category-2 LBT; and after detecting that a channel is idle, transmit, in the self-contained subframe through the channel, the UL grant corresponding to the user equipment.

18. The non-transitory computer-readable storage medium according to claim 17, wherein after performing the LBT based on the contention window, the programming instructions instruct the processor to:

determine a maximum channel occupation time (MCOT); and if a next self-contained subframe in which UL grant is to be performed is within the MCOT, before performing a next time of UL grant, perform channel detection by using category-2 LBT; or if a next self-contained subframe in which UL grant is to be performed is not within the MCOT, before performing the next time of UL grant, perform channel detection by using category-4 LBT.

19. The non-transitory computer-readable storage medium according to claim 15, wherein the UL grant further carries indication information used for indicating a category of LBT that needs to be performed by the user equipment.

* * * * *